United States Patent
Tallet et al.

(10) Patent No.: US 8,208,407 B2
(45) Date of Patent: Jun. 26, 2012

(54) OPTIMIZED FLUSH OPERATION IN RESPONSE TO TOPOLOGY CHANGES FOR SPANNING TREE PROTOCOLS

(75) Inventors: Francois Edouard Tallet, Santa Clara, CA (US); Rohit Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 12/192,562

(22) Filed: Aug. 15, 2008

(65) Prior Publication Data

US 2010/0039961 A1 Feb. 18, 2010

(51) Int. Cl.
H04L 12/26 (2006.01)
H04L 12/28 (2006.01)
H04L 12/54 (2006.01)
H04L 12/56 (2006.01)
G06F 15/16 (2006.01)
G06F 15/173 (2006.01)
G06F 15/177 (2006.01)
G06F 9/26 (2006.01)
G06F 9/34 (2006.01)

(52) U.S. Cl. ........ 370/255; 370/235; 370/236; 370/254; 370/401; 370/428; 709/220; 709/238; 709/249; 711/202; 711/221

(58) Field of Classification Search .................. 370/256, 370/235, 236, 254, 255, 401, 428; 709/220, 709/238, 249; 711/202, 221
See application file for complete search history.

(56) References Cited

U.S. PATENT DOCUMENTS

| | | | |
|---|---|---|---|
| 5,740,171 A | 4/1998 | Mazzola et al. | |
| 5,764,636 A | 6/1998 | Edsall | |
| 6,298,061 B1 | 10/2001 | Chin et al. | |
| 6,850,486 B2 | 2/2005 | Saleh et al. | |
| 6,856,627 B2 | 2/2005 | Saleh et al. | |
| 6,990,068 B1 | 1/2006 | Saleh et al. | |
| 7,002,917 B1 | 2/2006 | Saleh et al. | |
| 7,003,705 B1 * | 2/2006 | Yip et al. | 714/717 |
| 7,065,036 B1 | 6/2006 | Ryan | |
| 7,284,053 B1 | 10/2007 | O'Rourke et al. | |
| 7,379,429 B1 * | 5/2008 | Thottakkara | 370/256 |
| 7,720,011 B1 * | 5/2010 | Thottakkara | 370/256 |
| 2006/0221950 A1 * | 10/2006 | Heer | 370/389 |
| 2007/0019646 A1 * | 1/2007 | Bryant et al. | 370/390 |
| 2007/0159987 A1 | 7/2007 | Khan et al. | |
| 2007/0159988 A1 | 7/2007 | Khan et al. | |
| 2008/0031257 A1 * | 2/2008 | He | 370/395.31 |
| 2008/0123561 A1 * | 5/2008 | Sharma et al. | 370/256 |
| 2008/0279196 A1 * | 11/2008 | Friskney et al. | 370/395.53 |
| 2010/0027543 A1 * | 2/2010 | Rustagi et al. | 370/392 |

* cited by examiner

*Primary Examiner* — Marsha D Banks Harold
*Assistant Examiner* — Saad Hassan
(74) *Attorney, Agent, or Firm* — Cesari and McKenna, LLP

(57) ABSTRACT

In one embodiment, in response to receiving a topology change notification at a network bridge having ports identified as either a network port or an edge port, address learning may be disabled on the network bridge. Once address learning is disabled, an association of all entries of a forwarding table of the network bridge having addresses previously forwarded on a particular network port of the network bridge may be changed to forward those addresses on all network ports of the network bridge (e.g., flooding the frames not addressed to edge ports on all network ports only). Subsequently, address learning may be enabled on the network bridge, thus repopulating the network port entries of the forwarding table in response to the topology change.

24 Claims, 8 Drawing Sheets

OPTIMIZED FLUSH OPERATION IN RESPONSE TO TOPOLOGY CHANGES FOR SPANNING TREE PROTOCOLS

TECHNICAL FIELD

The present disclosure relates generally to computer networks, and, more particularly, to flush operations of spanning tree protocols.

BACKGROUND

Transparent bridges learn Media Access Control (MAC) addresses on their ports so that frames can be directed efficiently toward their destination, avoiding unnecessary flooding. For instance, if a bridge receives a frame from a particular source MAC address on one of its ports, then that bridge creates an entry in a forwarding database (e.g., in a content addressable memory, or "CAM") associating that MAC address with that port. Thus, when the bridge receives a frame destined for that MAC address, the bridge need only transmit the frame on that particular learned port. Otherwise, if the bridge does not have an entry for the destination MAC address of the frame, the frame is flooded (transmitted) on all ports (except the receiving port) to ensure that the frame reaches the unlearned destination.

In response to a topology change in a bridged network, a spanning tree protocol (STP) recalculates a new topology, which requires that bridges in the network "flush" (clear/remove) their learned address entries to be repopulated in response to the change. The flush operation is necessary to avoid "black-holing" any traffic by transmitting frames based on obsolete entries (i.e., before, and affected by, the topology change) such that the frames never reach their destination. Currently, then, to provide for immediate restoration of connectivity, (substantially) all filtering database entries are cleared (flushed) and traffic is flooded on (substantially) all ports of the bridges in the network. Because of this, high volume traffic received on uplinks of a bridge may be temporarily forwarded to lower bandwidth access ports, thus saturating their links and impacting their connected end devices. Also, various standards, such as Rapid STP (RSTP), achieve reliability by repeating topology change messages that trigger the flush, so any newly learned (repopulated) address entries from traffic/frames received after an initial flush may be flushed again, adding stress and wasting resources of the affected bridges.

BRIEF DESCRIPTION OF THE DRAWINGS

The embodiments described herein may be understood by referring to the following description in conjunction with the accompanying drawings in which like reference numerals indicate identically or functionally similar elements, of which.

DESCRIPTION OF EXAMPLE EMBODIMENTS

Overview

Figure 1:
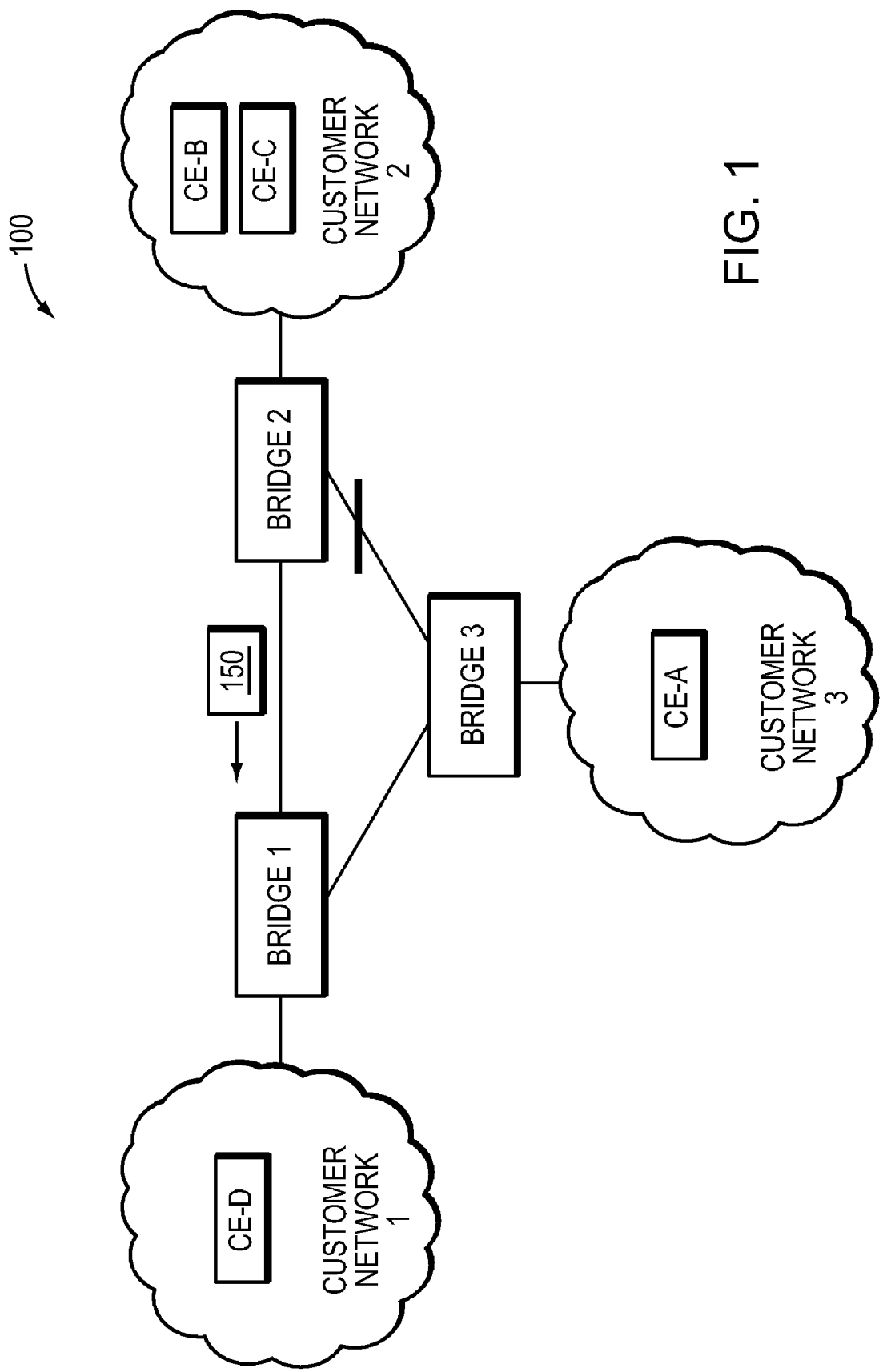
FIG. 1 illustrates an example computer network.

According to embodiments of the disclosure, in response to receiving a topology change notification at a network bridge having ports identified as either network ports or edge ports, address learning may be disabled on the network bridge. Once address learning is disabled, an association of all entries of a forwarding table of the network bridge having addresses previously forwarded on a particular network port of the network bridge may be changed to forward those addresses on all network ports of the network bridge (e.g., flooding the frames not addressed to edge ports on all network ports only). Subsequently, address learning may be enabled on the network bridge, thus repopulating the network port entries of the forwarding table in response to the topology change.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs or end stations. (Notably, a bridge may also be referred to as a switch, which may provide a switching function, and bridge and switch are used interchangeably herein, as understood by those skilled in the art.) Typically, the bridge is a computer and includes a plurality of ports that are coupled to the LANs or end stations. Ports used to couple bridges to each other are generally referred to as a trunk ports, whereas ports used to couple bridges to LANs or end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer 2 (L2) which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the bridging function, L2 bridges examine the MAC destination address of each data frame received on a source port. The frame is then switched onto the destination port(s) associated with that MAC destination address.

Other devices, commonly referred to as routers, may operate at higher communication layers, such as Layer 3 (L3) of the OSI Reference Model, which in Transmission Control Protocol/Internet Protocol (TCP/IP) networks corresponds to the Internet Protocol (IP) layer. Packets at the IP layer also include a header which contains an IP source address and an IP destination address. Routers or L3 switches may re-assemble or convert received data frames from one LAN standard (e.g., Ethernet) to another (e.g. token ring). Thus, L3 devices are often used to interconnect dissimilar subnetworks.

FIG. 1 is a schematic block diagram of an example computer network 100 illustratively comprising nodes/devices, such as bridges 1-3 and customer networks 1-3 interconnected as shown. For example, within customer networks 1-3 may be one or more customer devices (customer equipment) such as CE-A in network 3, CE-B and CE-C in network 2, and CE-D in network 1. Those skilled in the art will understand that any number of nodes, devices, links, etc. may be used in the computer network, and that the view shown herein is for illustration. For example, while the network 100 of bridges is shown as a simple segment of a small number of bridges, the embodiments described herein may also be applicable to "chains" or "rings" of bridges, e.g., large numbers of bridges. Those skilled in the art will also understand that while the embodiments described herein are described generally, they may apply to any network configuration. In particular, the customer networks may be interconnected to the bridges 1-3 with an access network, or may be directly interconnected with the bridges. The computer network 100 of FIG. 1 is meant for illustration purposes only and is not meant to limit the embodiments described herein.

Frames 150 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. As such, each bridge includes one or more ports/interfaces for receiving and forwarding the network messages. Notably, as described below, ports of a bridge (1-3) interconnected with other bridges of the network are referred to as "network ports," while ports interconnected with customer/access networks are referred to as "edge ports."

Figure 2:
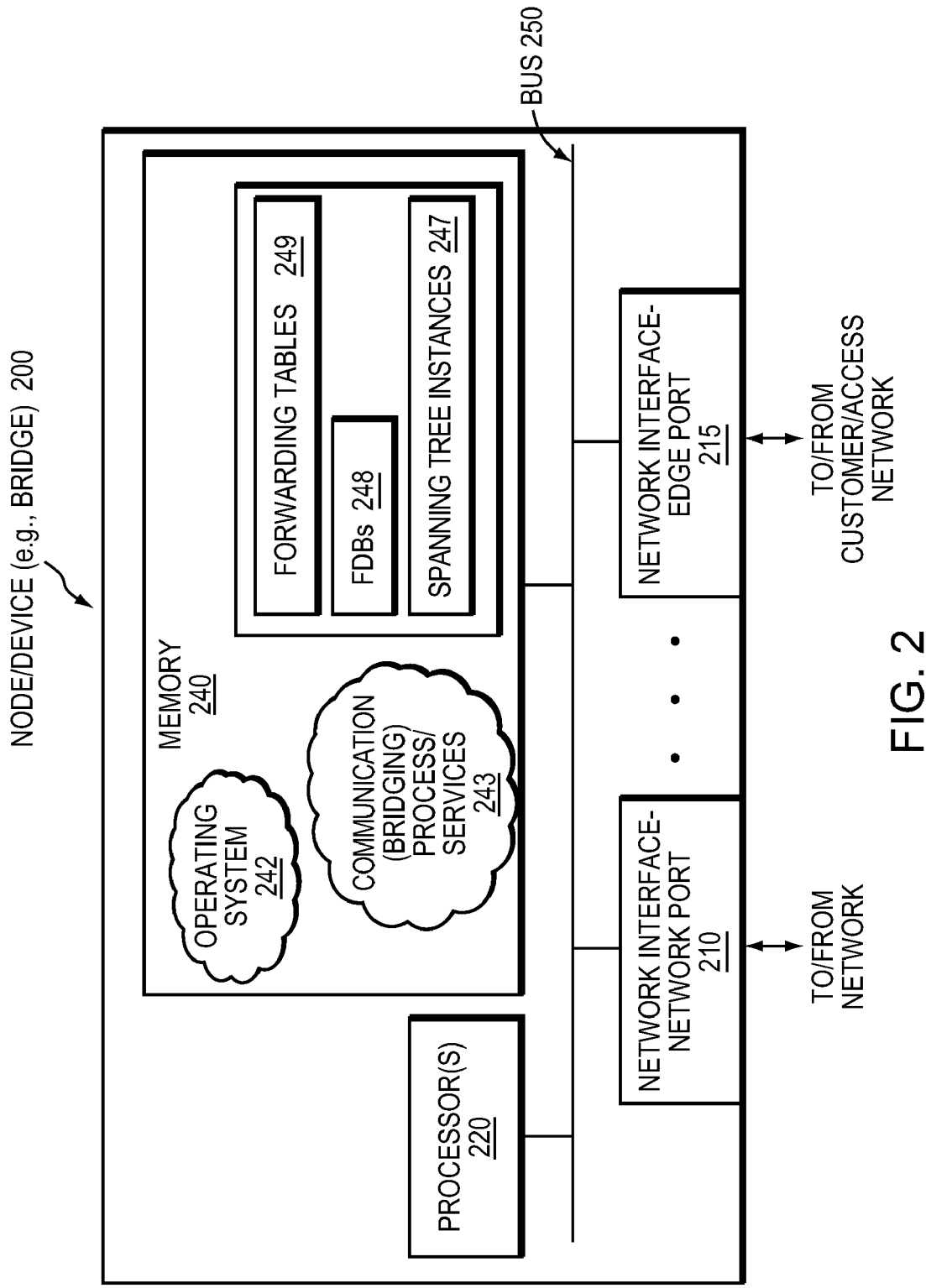
FIG. 2 illustrates an example network device/node.

FIG. 2 is a schematic block diagram of an example node/device 200 that may be advantageously used with one or more embodiments described herein, e.g., as a bridge (or switch). The device comprises a plurality of network interfaces or ports 210/215 (network/edge ports), one or more processors 220, and a memory 240 interconnected by a system bus 250. The network interfaces/ports 210/215 contain the mechanical, electrical, and signaling circuitry for communicating data over physical links coupled to the network 100. The network interfaces/ports may be configured to transmit and/or receive data (frames 150) using a variety of different communication protocols over physical links or wireless links. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210/215 may also be used to implement one or more virtual network interfaces, such as for Virtual Private Network (VPN) access or Virtual LANs (VLANs), as will be understood by those skilled in the art. Illustratively, the handling of frames 150 within the network interfaces/ports 210/215 may conform to a protocol stack (not shown) that defines the functions performed by the data link and physical layers of a communications architecture.

The memory 240 comprises a plurality of storage locations that are addressable by the processor(s) 220 and the network interfaces/ports 210/215 for storing software programs and data structures associated with the embodiments described herein. The processors 220 may comprise necessary elements or logic adapted to execute the software programs and manipulate the data structures, such as forwarding tables 249, filtering databases (FDBs or FIDs) 248, spanning tree instances 247, etc. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise communication process/services 243 as described herein. It will be apparent to those skilled in the art that other types of processors and memories, including various computer-readable media, may be used to store and execute program instructions pertaining to the inventive technique described herein.

Communication process/services 243 contain computer executable instructions executed by the processor(s) 220 to perform functions provided by one or more communication protocols, such as various switching/bridging protocols (e.g., thus being referred to herein as "bridging process 243"). For instance, an example bridging protocol is the known IEEE standard 802.1 (e.g., 802.1D and 802.1Q). These functions may be configured to manage switching databases (e.g., spanning tree instances 247), FDBs 248, or tables 249 containing, e.g., data used to make switching/forwarding decisions, as will be understood by those skilled in the art, and additionally as described herein. In particular, as part of bridging process 243, a spanning tree process (not shown) may execute to perform functions provided by one or more spanning tree protocols (STPs), such as the known Rapid STP (RSTP) and/or Multiple STP (MST). STPs may generally communicate protocol messages as frames 150, such as Bridge Protocol Data Units (BPDUs), which contain various information relevant to the protocol. For instance, BPDUs may carry information regarding ports, addresses, priorities, and costs, and ensure that the traffic (data) reaches its intended destination, such as by detecting and removing loops by "blocking" certain ports (e.g., between Bridge 2 and Bridge 3).

In addition to BPDUs, bridges (e.g., "transparent bridges") learn MAC addresses on their ports so that frames can be directed efficiently toward their destination, avoiding unnecessary flooding. For instance, as noted above, if a bridge receives a frame from a particular source MAC address on one of its ports, then that bridge creates an entry in a forwarding table 249 (or FDB 248) associating that MAC address with that port. Thus, when the bridge receives a frame destined for that MAC address, the bridge need only transmit the frame on that particular learned port. Otherwise, if the bridge does not have an entry for the destination MAC address of the frame, the frame is flooded (transmitted) on all ports (except the receiving port) to ensure that the frame reaches the unlearned destination. Notably, the forwarding table 249 (and/or FDB 248) may be operated as a content-addressable memory (CAM) as will be understood by those skilled in the art.

That is, according to RSTP (and as used herein), a bridge port may be identified as either a network port or an edge port. Specifically, an edge port 215 may be adapted to communicate with one or more edge devices (i.e., connected to hosts/end devices, such as customer equipment or access networks), while a network port 210 may be adapted to communicate with one or more network devices (e.g., peer bridges/switches). Generally, devices (MAC addresses) associated with edge ports 215 remain stationary (that is, are physically connected, and rarely move from one port to another on a bridge), and the edge ports are often small links or lower bandwidth access ports. Conversely, network ports 210 are usually larger links (e.g., uplinks) receiving a high volume of traffic, receiving many flooded frames and having a topology that changes more often.

In particular, as also noted above, in response to a topology change in a bridged network, STP recalculates a new topology, which requires that bridges in the network "flush" (clear/ remove) their learned address entries to be repopulated in response to the change. RSTP topology change indications are carried using a topology change bit (TC) in BPDUs (e.g., frames 150, often repeated to achieve reliability in triggering the flush). When a TC is received on a network port 210 (since edge ports 215 generally do not receive BPDUs, as will be appreciated by those skilled in the art), RSTP flushes all the CAM entries (forwarding table 249) associated to the network ports 210 on the bridge. As a result of this flush, as mentioned above, any frame whose MAC address had been earlier learned on a network port will be flooded to all ports of the bridge, thus being flooded to the edge ports 215. It is unlikely, however, that such a topology change may affect the edge ports 215, thus the flooding to the edge ports 215 is generally unnecessary and wasteful (e.g., particularly due to the smaller links generally associated with edge ports).

Optimized Flush Operations in Response to Topology Changes

According to embodiments of the disclosure, in response to receiving a topology change notification, a topology change period may be entered at a network bridge having ports identified as either network ports 210 or edge ports 215, and address learning may be disabled on the network bridge during the topology change period. Also, in response to the topology change period, an association of all entries of a forwarding table of the network bridge having addresses previously forwarded on a particular network port of the network bridge may be changed to forward those addresses only on all network ports of the network bridge (e.g., flooding the frames not addressed to edge ports on all network ports only). Once the topology change period has concluded, address learning may be enabled on the network bridge, thus repopulating the network port entries of the forwarding table in response to the topology change.

Illustratively, the techniques described herein may be performed by hardware, software, and/or firmware, such as in accordance with a general "bridging" (or "switching") processes/services 243. These processes and/or services may be configured to operate in accordance with certain protocols (e.g., RSTP and/or MST), and in accordance with the techniques described herein.

Figure 3:
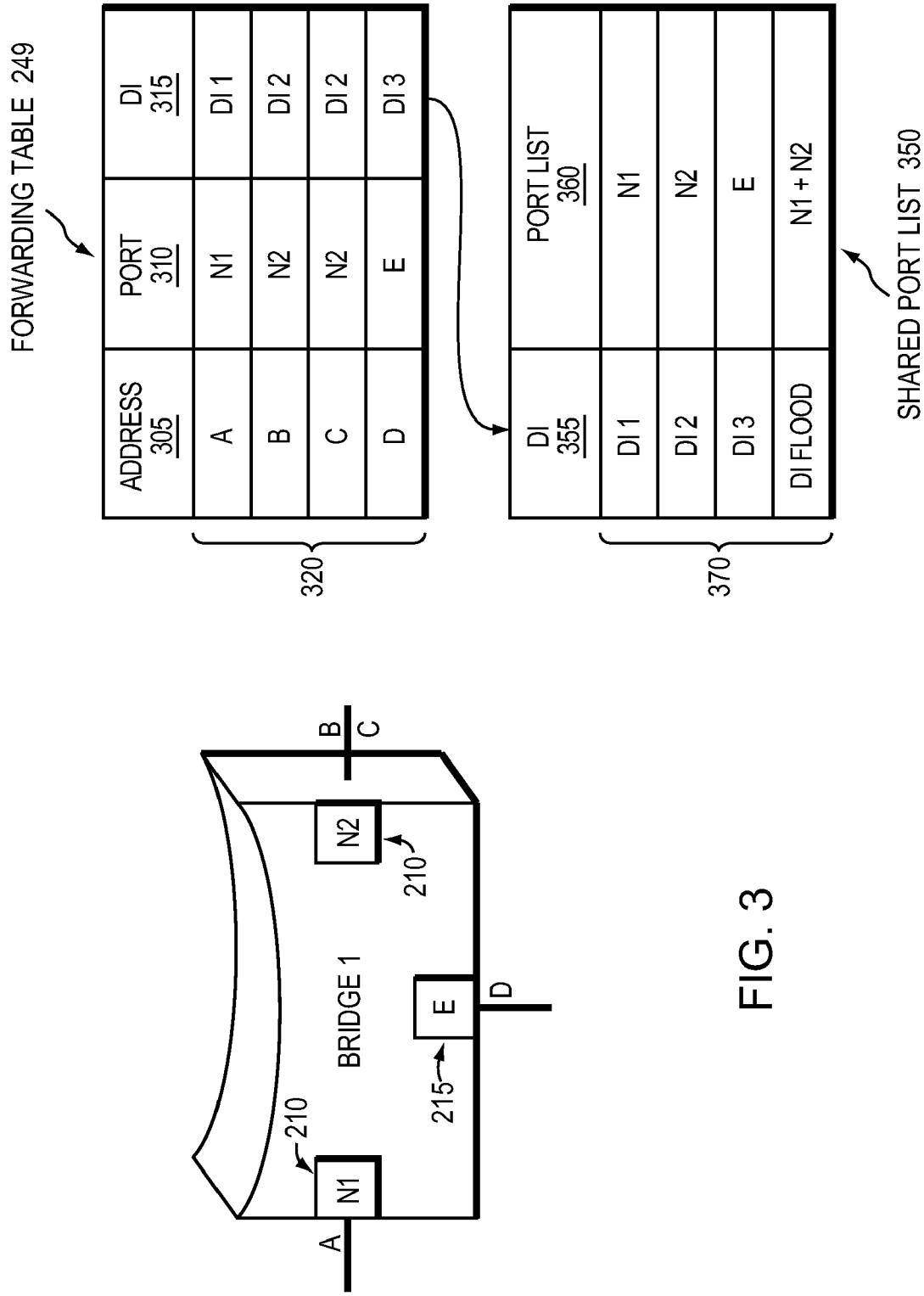
FIGS. 3-7 illustrate an example bridge and corresponding forwarding table entries/shared lists according to various aspects of an optimized STP flush operation in response to topology changes.

FIGS. 3-7 illustrate an example bridge (e.g., bridge 1) and corresponding forwarding table entries/shared lists according to various aspects of an optimized STP flush operation in response to topology changes. For instance, as shown in FIG. 3, "N1" and "N2" are network ports 210, illustratively indicating in FIG. 3 that MAC address "A" is reachable via port N1, and MAC addresses "B" and "C" are reachable via port N2. Also, an edge port "E" 215 is shown, which may be interconnected with a customer/access network (e.g., with a MAC address "D") as mentioned above. Forwarding table 249 illustratively includes one or more entries 320, each of which is used for storing the MAC address associations as described herein through a plurality of fields for storing an address 305, an associated port 310, and a "destination index" (DI) 315. The table 249 may be illustratively maintained and managed by appropriate processes of the bridge, e.g., communication/bridging process 243 (e.g., an STP process). Those skilled in the art will understand that while a table is shown and described herein, other known data structures and entries may be used in accordance with the present invention, and the table 249 as shown is merely illustrative.

As an example, MAC address "A" is associated with (and reachable via) network port "N1", and as such, the corresponding entry 320 for address "A" includes the associated port "N1". Illustratively, each network port may be associated to a "destination index" (DI) 315, which represents the destination (for forwarding purposes) as an index to one or more shared port lists 350. Initially, the DI 315 for each network port 210 includes only that port. For instance, "DI1" (as shown in DI index field 355 of shared port list 350) includes an entry 370 in port list field 360 comprising "N1", indicating that MAC address "A" may be forwarded on port "N1", accordingly. Also, both MAC addresses "B" and "C" may be forwarded on port "N2", while "D" may be forwarded on edge port "E". A novel DI of "DIflood" may be used that indicates that a frame having an entry 320 indexing the "DIflood" port list should be flooded to both "N1" and "N2" (configured as all of the network ports 215 for use as described herein).

Operationally, according to one or more embodiments described herein, a bridge (e.g., bridge 1) may receive a topology change notification (e.g., a BPDU with a TC or a port state change originated at the bridge itself), and in response, enters a topology change period. (Notably, in response to receiving a plurality of topology change notifications for a same topology change, e.g., where STP retransmits a BPDU with the TC indicator for reliability, all but the first topology change notification may be ignored). During the topology change period, address learning on the bridge is disabled, but the table 249 need not be flushed. In particular, in accordance with the embodiments described herein, MAC addresses may change several times from one network port to another during the topology change period (those skilled in the art will appreciate that STP periodically flushes the entries during a conventional topology change). Also, the entries need not be completely flushed as there is still value in the entries of network ports after the topology change; that is, those entries identify end stations (MAC addresses) that are reachable through a group of network ports 210 (instead of a unique network port before the topology change) and not through the edge ports 215.

Figure 4:
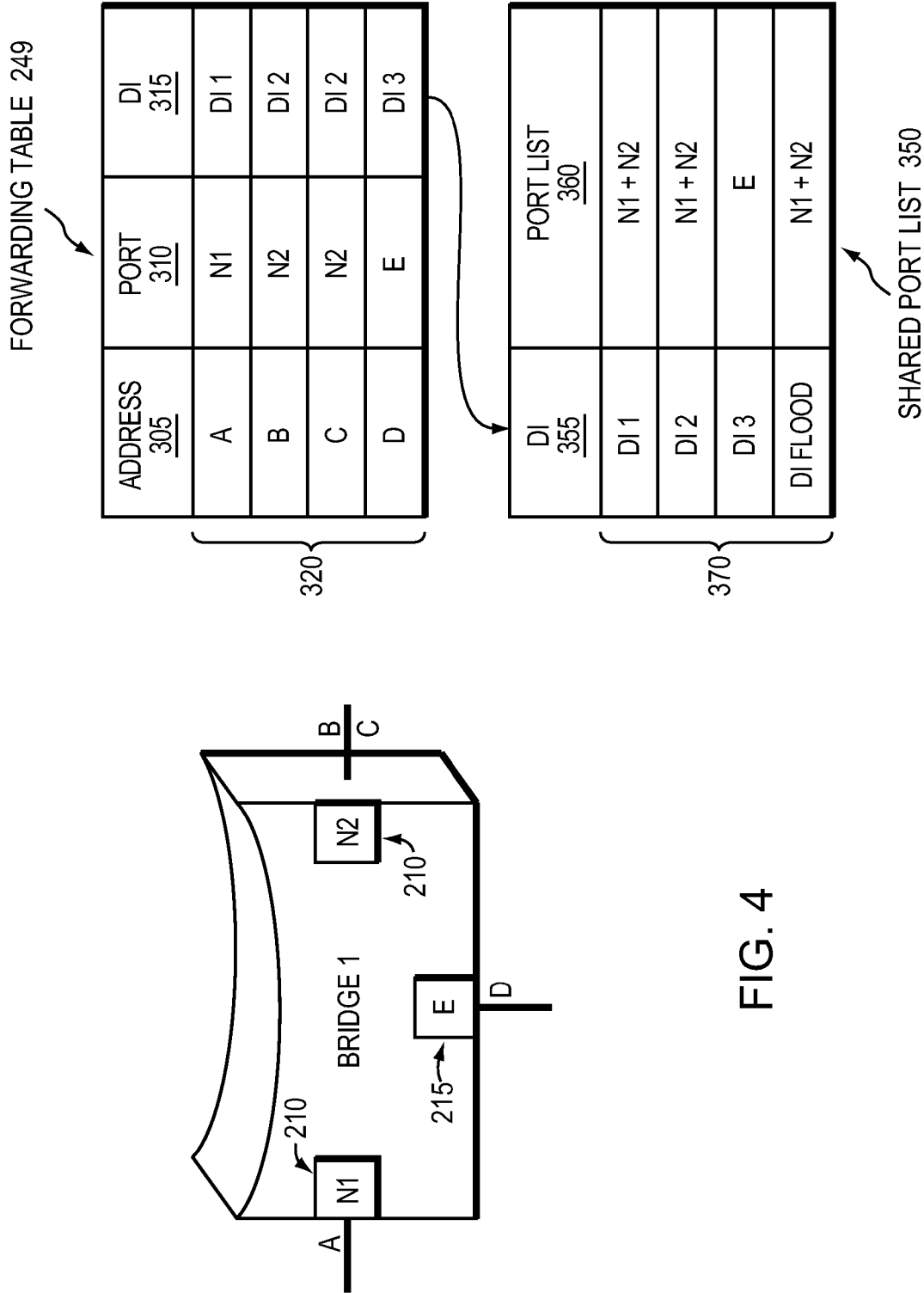
Figure 5:
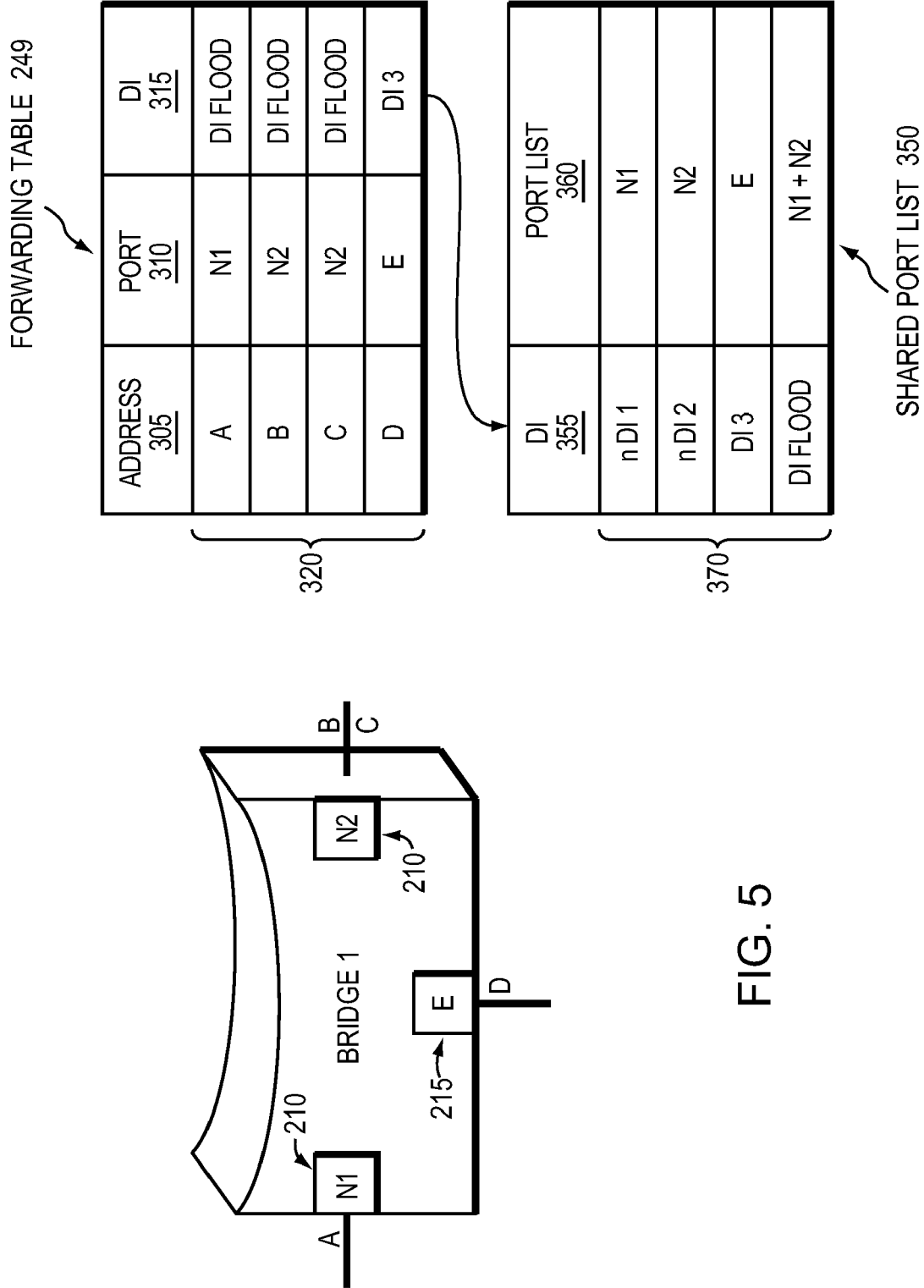

Accordingly, rather than flush the entries in response to the topology change period, an association of all entries 320 of the forwarding table 249 having addresses previously forwarded on a particular network port of the bridge may be changed to forward those addresses only on all network ports of the bridge. For instance, while one manner of changing the associations is to flush all the entries having addresses previously forwarded on a particular network port, a more efficient manner (if configured to do so) is to update the port lists 360 indexed by entries 320 (DIs 315) of those addresses. For example, as shown in FIG. 4, all of the DIs 355 of shared port list 350 that correspond to a network port 210 (e.g., N1 or N2) may have their associated port list 360 updated to include a list of all of the network ports of the bridge (e.g., N1 and N2).

In the event that a frame 150 is received during the topology change period, that frame may be forwarded by the bridge according to the current state of the associated forwarding table entry 320 (i.e., based on the destination MAC address of the frame). For instance, if the frame is received destined to an address associated in the forwarding table with an edge port (e.g., MAC address "D"), then the frame may be forwarded on the associated edge port "E" (e.g., via index DI3, unchanged during the topology change period). Conversely, if during the topology change period, a frame is received destined to an address associated in the forwarding table with a network port, then that frame would be forwarded (flooded) to all network ports (N1 and N2) based on the changed port list 360 for the associated DI for the destination address. (Note that the network port receiving the frame 150 may be excluded from the flooding, such that, e.g., if N1 receives the frame, the flooding only occurs on N2.) While receiving frames 150, however, learning is not performed for the addresses (it has been disabled for the topology change period). Also, should a frame 150 be received having an unknown address, that frame may be flooded to all ports (network and edge ports) in a conventional manner, since there is no indication (no previous table entry 320) as to whether the destination is to be found on a network port or an edge port.

Once it has been determined that the topology change period has concluded, e.g., in response to a received notification (e.g., an RSTP BPDU or an expired timer initiated in response to entering the topology change period), address learning is then enabled on the bridge. For instance, in FIG. 5, one manner to illustratively re-enable address learning may be to assign a new DI ("nDI") 355 to each network port in shared list 350, where the nDI for a particular port includes only that port in its list 360. Accordingly, MAC address table entries 320 may be updated to use DIflood to continue flooding the frames (for network ports) on all of the network ports until the table entries 320 are repopulated. In particular, since the topology has changed, no assumptions may be made as to where a MAC address may be located (other than, illustratively, that it remains on a network port). Accordingly, all MAC addresses associated with network ports must be relearned (e.g., moved or confirmed) prior to updating the corresponding entry.

Figure 6:
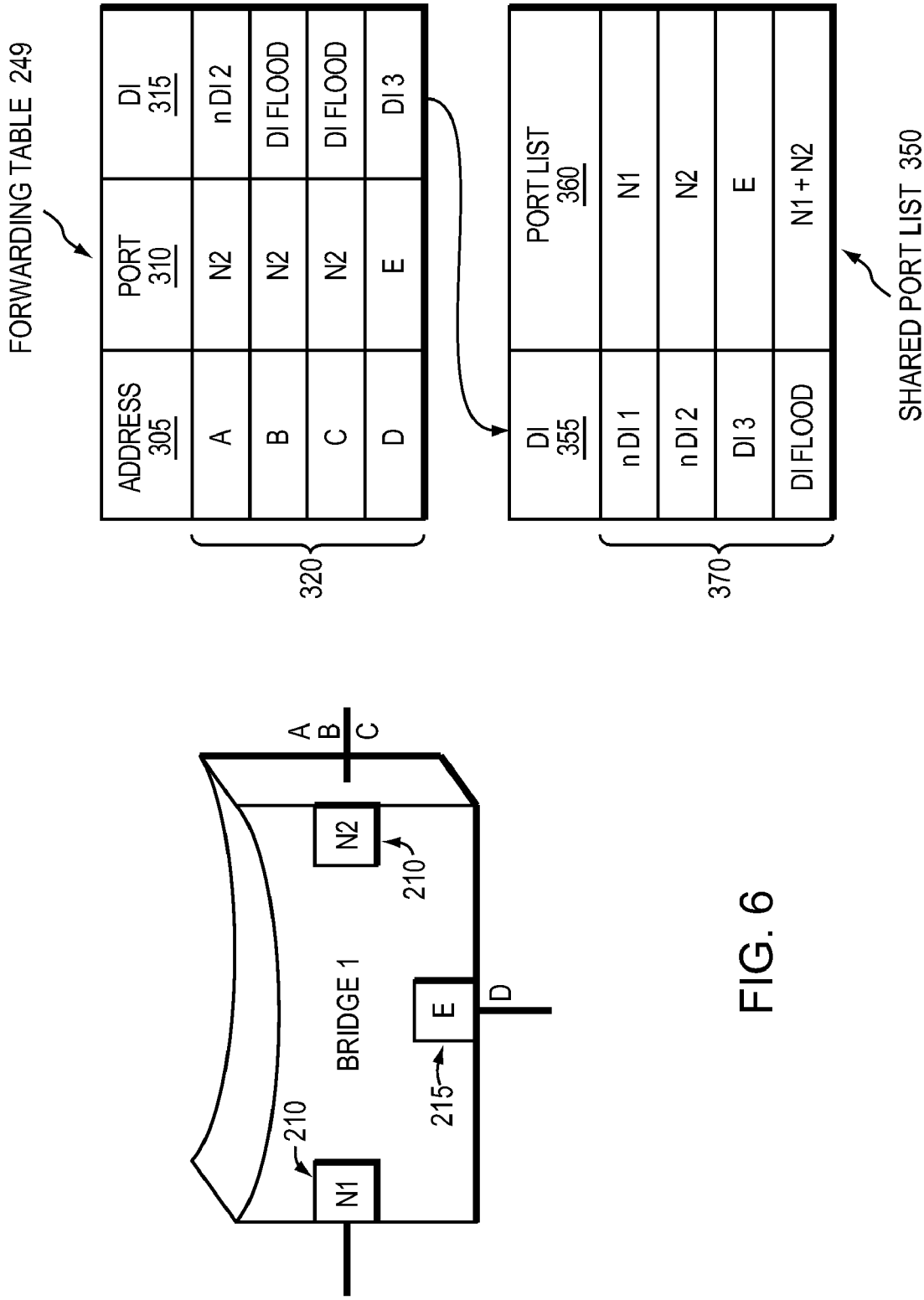
Figure 7:
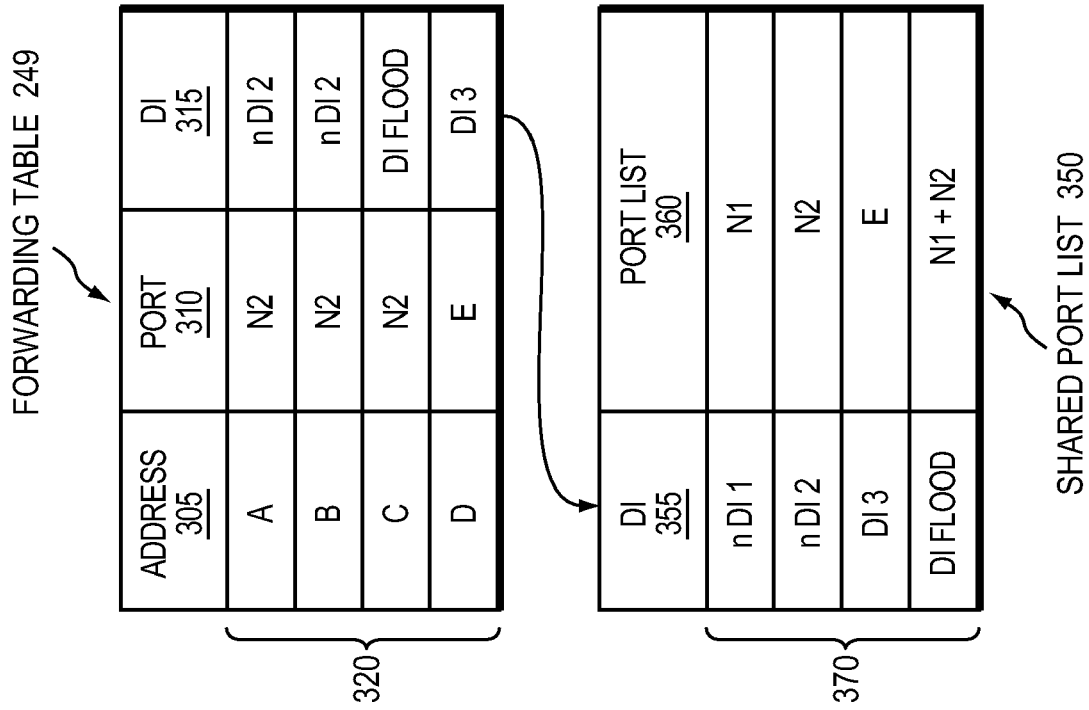
Figure 7:
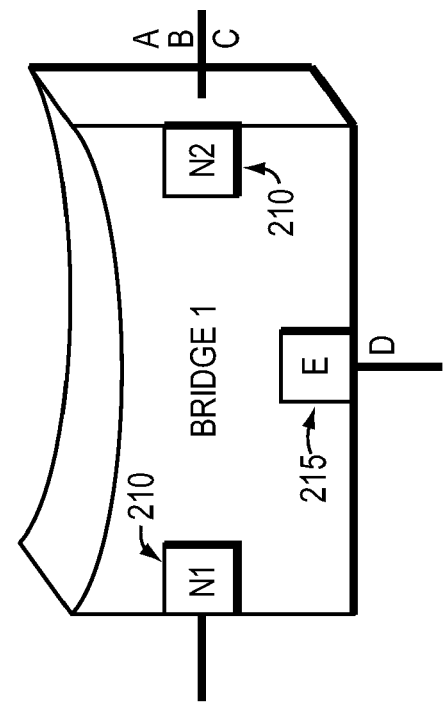

Now that address learning has been enabled after the conclusion of the topology change period, entries 320 may be gradually replaced with more specific entries (e.g., pointing to a unique port) or aged out. For example, if a frame 150 is received at the bridge on network port N2 from MAC address "A" while learning is enabled, then, as illustrated in FIG. 6, the bridge learns the new port (N2) for the address ("A"), and the table entry 320 is updated/changed to index to the new port (i.e., port N2 and DI "nDI2", which indexes to port N2). On the other hand, however, if a frame 150 is received at the bridge on network port N2 from MAC address "B", the bridge learns the same port (N1, as in field 310), and the table entry 320 is not updated/changed. In particular, bridges are able to determine when MAC addresses move from one port to another, so those changes may be quickly associated to a single/unique destination port (e.g., MAC address A's move). MAC addresses that did not move after the topology change, however, may not trigger the update of their CAM entries 320, since the ports do not change (e.g., address "B" remains on port "N2", so an associated DI may not be adjusted to the appropriate new DI, e.g., nDI2).

One solution to this concern comprises "browsing" the network port entries 320 to determine whether an age of the forwarding table entry associated with an address is more recent than the conclusion of the topology change period. If it is more recent, then the bridge ensures that the forwarding table entry associated with that address indexes to a port learned while learning was enabled. For instance (with reference to FIG. 7), the table 249 may be "walked" through (e.g., one entry at a time) to determine whether the entry is associated with a network port, and whether the entry is newer than the conclusion of the topology change period (i.e., has been learned after the change). If the age is more recent (e.g., for address "B", relearned after the topology change period), then the DI 315 of that entry is updated (or confirmed) to the new DI (e.g., nDI2 for network port N2). On the other hand, if the age is not more recent (e.g., for address "C", not learned since the topology change period), then the DI 315 of that entry remains unchanged as the old DI (e.g., DIflood for network ports N1 and N2) until the address is re-learned. In this manner, those MAC addresses that have not moved since the topology change are flooded until the table 249 is updated (e.g., slowly) to remove old DIs and replace them with new nDIs, or remaining as DIflood (or timed/aged out) if new learning does not occur for a particular address (e.g., address "C"). For example, MAC address "C" may have also moved or been removed from the network, and until its port is relearned, no assumptions of its location may be made.

Figure 8:
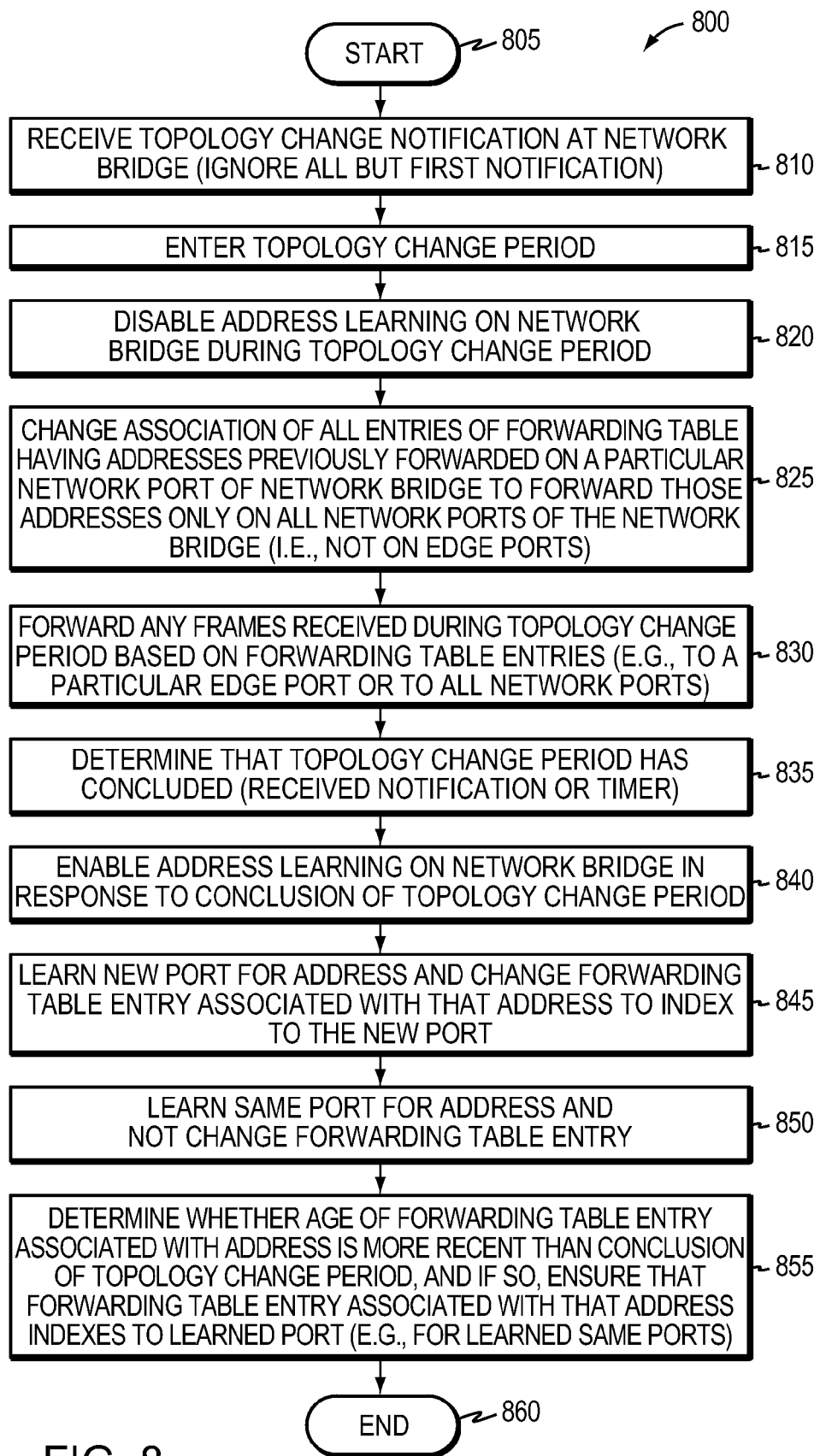
FIG. 8 illustrates an example procedure for optimizing STP flush operations in response to topology changes.

FIG. 8 illustrates an example procedure for optimizing STP flush operations in response to topology changes in accordance with one or more embodiments described herein. The procedure 800 starts at step 805, and continues to step 810, where a network bridge (e.g., Bridge 1) receives a topology change notification (e.g., a BPDU with a TC indicator). (As noted above, all but the first notification are ignored in the event STP transmits duplicate notifications.) In response to the notification, the bridge enters a topology change period in step 815, for which time address learning is disabled (step 820) on the network bridge. Also, upon entering the topology change period, the bridge (in step 825) changes association of all entries 320 of its forwarding table 249 having addresses previously forwarded on a particular network port 210 to forward frames with those addresses only on all network ports 210 of the network bridge (i.e., not on edge ports 215), as described in more detail above.

In step 830, any frames received during the topology change period are forwarded based on corresponding forwarding table entries (e.g., to a particular edge port or to all network ports, as described above), until the bridge determines in step 835 that the topology change period has concluded (e.g., has received a notification or a timer has expired). Once the topology change period has concluded, the network bridge enables address learning in step 840, and may begin to repopulate its network port entries in the forwarding table 249. Accordingly, in step 845, any newly learned port for an address may cause a change in the forwarding table entry associated with that address to index to the new port. On the other hand, however, in step 850, if the same port is "learned" for an address after the topology change, certain bridges (as configured) may or may not change the corresponding forwarding table entry (i.e., the port is the same, so there is no trigger to update the entry's index pointer). As such, in step 855, the bridge, as described above, may determine whether the age of each forwarding table entry associated with an address (e.g., for network ports) is more recent than the conclusion of the topology change period. If so, the bridge may ensure that the forwarding table entry associated with that address indexes to the learned port, that is, may update the index to reflect the unchanged port, as opposed to continuing to index all network ports (as changed above in step 825). The procedure 800 ends in step 860, notably continuing to learn/update addresses in steps 845-855 and/or to receive a new topology change notification in step 810 to begin the procedure again.

Advantageously, the novel techniques described herein optimize STP flush operations in response to topology changes in a computer network. By ensuring that edge ports do not receive unnecessary flooded traffic during a topology change, the novel techniques reduce the load resulting from a topology change and minimize the impact of a topology change on edge (access) ports. In particular, previous techniques flushed all forwarding table entries (from one unique port to all ports, edge and network) in response to a topology change, where the techniques described herein change forwarding table entries for network ports such that frames to a MAC address associated with a network port are flooded on all network ports only. Notably, the techniques described herein may be performed efficiently on any platform that performs learning in software, and is an entirely local implementation, thus does not present interoperability issues with other standards or other bridge types in the computer network.

While there have been shown and described illustrative embodiments that optimize STP flush operations in response to topology changes in a computer network, it is to be understood that various other adaptations and modifications may be made within the spirit and scope of the present invention. For example, the embodiments have been shown and described herein using particular terminology and fields based on current standards. However, the embodiments of the invention in their broader sense are not so limited, and may, in fact, be used with other similar technology using different terms and/or standards. For example, the techniques described above reference RSTP and MST as spanning tree protocols, but the techniques may also be applicable to the known Resilient Ethernet Protocol (REP) or Flexlink protocol. Also, while the description above illustrates example network and device configurations, other configurations may be used in accordance with the techniques described herein, e.g., enterprise networks, service provider networks, Metro Ethernet, etc., as will be appreciated by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium (e.g., a CD/disk) having program instructions executing on a computer, hardware, firmware, or a combination thereof. For example, the embodiments herein may be encoded as logic in one or more tangible media for execution that when executed is operable to perform the techniques described above (e.g., an ASIC). Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
receiving a topology change notification at a network bridge having ports identified as either network ports or edge ports; and
in response:
entering a topology change period at the network bridge;
disabling address learning on the network bridge;
changing an association of a first set of one or more entries of a forwarding table of the network bridge having addresses previously forwarded on a particular network port of the network bridge, to have the first set of one or more entries indicate their addresses are to be forwarded on all network ports of the network bridge, but not on any edge ports of the network bridge, during the topology change period;
maintaining an association of a second set of one or more entries of the forwarding table having addresses previously forwarded on only a particular edge port of the network bridge, to have the second set of one or more entries indicate their addresses are to continue to be forwarded on only the particular edge port of the network bridge, during the topology change period;
determining that the topology change period has concluded at the network bridge; and
enabling address learning on the network bridge.

2. The method as in claim 1, further comprising:
wherein the enabling address learning on the network bridge is in response to conclusion of the topology change period.

3. The method as in claim 1, further comprising:
wherein the determining that the topology change period has concluded at the network bridge is in response to a received notification.

4. The method as in claim 1, further comprising:
wherein the determining that the topology change period has concluded at the network bridge is in response to an expired timer initiated in response to receiving a topology change notification.

5. The method as in claim 1, further comprising:
receiving a plurality of topology change notifications for a same topology change; and
in response, ignoring all but the first topology change notification.

6. The method as in claim 1, further comprising:
changing the association by flushing the first set of one or more entries of the forwarding table of the network bridge having addresses previously forwarded on a particular network port of the network bridge.

7. The method as in claim 1, further comprising:
utilizing forwarding table entries to index to one or more port lists shared by the entries.

8. The method as in claim 7, further comprising:
changing the association by updating the port lists indexed by the first set of one or more entries having addresses previously forwarded on a particular network port of the network bridge to forward their addresses on all network ports of the network bridge.

9. The method as in claim 7, further comprising:
learning a new port for an address while learning is enabled; and in response,
changing the forwarding table entry associated with that address to index to the new port.

10. The method as in claim 7, further comprising:
learning a same port for an address while learning is enabled; and in response,
not changing the forwarding table entry associated with that address to index to the same port.

11. The method as in claim 10, further comprising:
determining whether an age of a forwarding table entry associated with an address is more recent than enabling address learning on the network bridge; and if so,
ensuring that the forwarding table entry associated with that address indexes to a port learned while learning was enabled.

12. The method as in claim 1, further comprising:
receiving, while address learning on the network bridge is disabled, a frame to an address associated in the forwarding table with an edge port; and in response,
forwarding the frame on the associated edge port.

13. The method as in claim 1, further comprising:
receiving a frame while address learning on the network bridge is disabled; and in response,
forwarding the frame based on an associated forwarding table entry corresponding to a destination address of the frame.

14. The method as in claim 1, further comprising:
receiving, while address learning on the network bridge is disabled, a frame to an address associated in the forwarding table with a network port; and in response, forwarding the frame on all network ports of the network bridge.

15. The method as in claim 14, further comprising:
receiving the frame on a particular network port of the network bridge, and
forwarding the frame on all network ports of the network bridge except for the particular network port receiving the frame.

16. An apparatus, comprising:
one or more edge ports adapted to communicate with one or more edge devices;
one or more network ports adapted to communicate with one or more network devices;
a processor coupled to the ports and adapted to execute one or more processes; and
a memory configured to store a forwarding table having entries for associating ports to addresses for forwarding, the memory further configured to store a bridging process executable by the processor, the bridging process when executed operable to: in response to receiving a topology change notification: disable address learning; enter a topology change period; change an association of a first set of one or more entries of the forwarding table having addresses previously forwarded on a particular network port to have the first set of one or more entries indicate their addresses are to be forwarded on all of the network ports but not on any of the edge ports during the topology change period; maintain an association of a second set of one or more entries of the forwarding table having addresses previously forwarded on only a particular edge port of the network bridge, to have the second set of one or more entries indicate their addresses are to continue to be forwarded on only the particular edge port of the network bridge, during the topology change period; determine that the topology change period has concluded; and enable address learning.

17. The apparatus as in claim 16, wherein the bridging process is further operable to:
enable the address learning in response to conclusion of the topology change period.

18. The apparatus as in claim 16, wherein the bridging process is further operable to:
determine that the topology change period has concluded in response to one of a received notification or an expired timer initiated in response to receiving a topology change notification.

19. The apparatus as in claim 16, wherein the bridging process is further operable to:
change the association by flushing the first set of one or more entries of the forwarding table having addresses previously forwarded on a particular network port.

20. The apparatus as in claim 16, wherein the forwarding table entries index to one or more port lists shared by the entries, and the bridging process is further operable to:
change the association by updating the port lists indexed by the first set of one or more entries having addresses previously forwarded on a particular network port to forward their addresses on all of the network ports.

21. One or more tangible computer readable media encoded with software comprising computer executable instructions and when the software is executed operable to:
receive a topology change notification; and
in response:
enter a topology change period;
disable address learning;
change an association of a first set of one or more entries of a forwarding table having addresses previously forwarded on a particular network port of the network bridge, to have the first set of one or more entries indicate their addresses are to be forwarded on all network ports of the network bridge, but not on any edge ports of the network bridge during the topology change period;
maintain an association of a second set of one or more entries of the forwarding table having addresses previously forwarded on only a particular edge port of the network bridge, to have the second set of one or more entries indicate their addresses are to continue to be forwarded on only the particular edge port of the network bridge, during the topology change period;
determine that the topology change period has concluded; and
enable address learning.

22. The one or more tangible computer readable media as in claim 21, wherein the software is when executed further operable to:
enable the address learning in response to conclusion of the topology change period.

23. The one or more tangible computer readable media as in claim 21, wherein the software is when executed further operable to:
forward a first frame on an associated edge port in response to receiving the frame to an address associated in the forwarding table with the edge port during the topology change period; and
forward a second frame on all network ports of the network bridge in response to receiving the frame to an address associated in the forwarding table with a particular network port.

24. An apparatus, comprising:
means receiving a topology change notification;
means for entering a topology change period in response to the topology change notification;
means for disabling address learning at the apparatus during the topology change period;
means for changing an association of a first set of one or more entries of a forwarding table of the apparatus having addresses previously forwarded on a particular network port of the apparatus, to have the first set of one or more entries indicate their addresses are to be forwarded on network ports of the apparatus, and not on any edge ports of the apparatus, during the topology change period;
means for maintaining an association of a second set of one or more entries of the forwarding table having addresses previously forwarded on only a particular edge port of the network bridge, to have the second set of one or more entries indicate their addresses are to continue to be forwarded on only the particular edge port of the network bridge, during the topology change period;
means for determining that the topology change period has concluded; and
means for enabling address learning at the apparatus.

* * * * *